E. H. ASHCROFT.

Fire-Extinguisher.

Reissued Sept. 21, 1875

No. 6,653.

WITNESSES.

W. T. Newman.

Robt. M. Parr.

INVENTOR

Edward H. Ashcroft.

By Leggett & Leggett. Attorneys.

UNITED STATES PATENT OFFICE.

EDWARD H. ASHCROFT, OF LYNN, ASSIGNOR, BY MESNE ASSIGNMENTS, TO R. A. BALLOU, OF BOSTON, MASSACHUSETTS.

IMPROVEMENT IN FIRE-EXTINGUISHERS.

Specification forming part of Letters Patent No. 54,662, dated May 15, 1866; reissue No. 2,917, dated April 14, 1868; reissue No. 6,653, dated September 21, 1875; application filed August 2, 1875.

DIVISION B.

*To all whom it may concern:*

Be it known that I, EDWARD H. ASHCROFT, of Lynn, in the county of Essex and State of Massachusetts, have invented certain new and useful Improvements in Automatic Fire-Extinguishers; and I do hereby declare the following to be a full, clear, and exact description of the invention, such as will enable others skilled in the art to which it pertains to make and use it, reference being had to the accompanying drawings, which form part of the specification.

My invention relates to fire-extinguishers.

Figure 1:
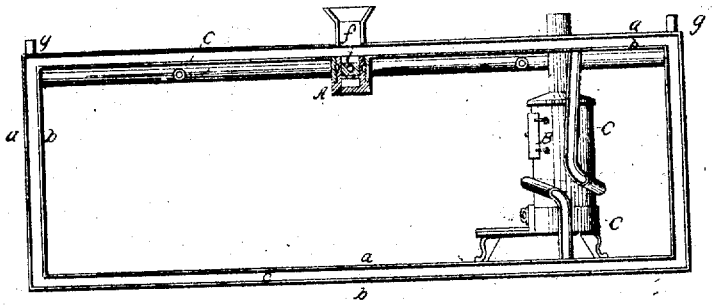
Figure 2:
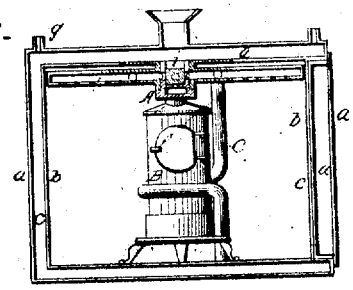
Figure 3:
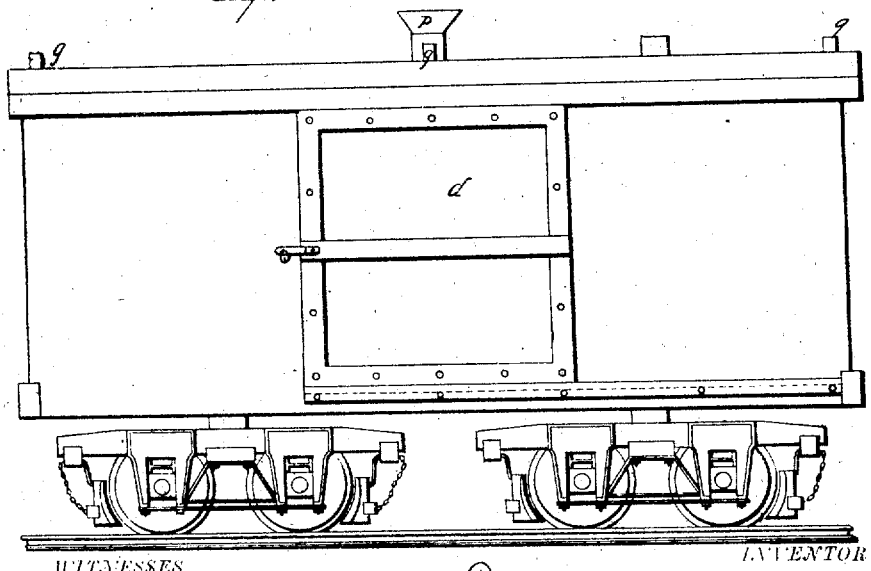

In the drawings, Figure 1 represents a longitudinal section of a railroad-car, provided with my invention; Fig. 2, a cross-section of the same, and Fig. 3 a view in side elevation of the same.

My invention consists in the following parts and combinations, as hereinafter specified and claimed, wherein—

*c* is a water-space or reservoir, which may be made partially or entirely to surround a car or other apartment. This water-space is provided between two walls or casings, *a* and *b*. In connection with the space *c*, and leading therefrom, is a series of water conduits or pipes, *h h*, arranged and distributed so as to extend both longitudinally and transversely within the car or apartment, each of said pipes being provided with perforations or holes *h'* on its under side.

All the pipes of the system should communicate with each other, so that water let into one would flow through the rest. Furthermore, the said system of pipes may communicate with a fusible plug apparatus, A *i*, of sufficient number, which may be suitably placed and distributed through the car or apartment.

Each fusible plug apparatus is connected and applied to the perforated pipes *h* and the water-space *c*, so that while the plug is in a congealed state it shall intercept communication between the said pipes *h* and the water-space *c*; and when melted, or in a fluid state from any conflagration or undue heat, said plug shall be free to flow, away or out of its socket, and thereby effect a communication between the pipes *f* and the water-space *c*, whereby water or steam from the latter may be induced to flow into the pipes *f*, and be discharged by them into the chamber of the car-receptacle or other apartment in such a manner as to flow upon goods, wares, or merchandise contained therein.

The fusible plug *i* should be of a character to melt at a certain given temperature somewhat lower than would be liable to burn or to do injury to any given material.

What I claim is—

1. A car or other apartment, provided with a water tank or space, *c*, in combination with one or more showering-pipes, *f*, and a fusible-plug apparatus, substantially as and for the purpose shown.

2. In combination with the water-space *c*, the fusible plug A and *i*, substantially as and for the purpose shown.

In testimony that I claim the foregoing I have hereunto set my hand this 28th day of July, 1875.

E. H. ASHCROFT.

Witnesses:
T. B. HALL,
EDWIN I. NOTTINGHAM.